(12) United States Patent
Calmon et al.

(10) Patent No.: US 10,373,511 B2
(45) Date of Patent: Aug. 6, 2019

(54) AUTOMATIC LEARNING CURRICULUM GENERATION

(71) Applicant: INTERNATIONAL BUSINESS MACHINES CORPORATION, Armonk, NY (US)

(72) Inventors: Flavio D. Calmon, White Plains, NY (US); Ravindranath Kokku, Yorktown Heights, NY (US); Aditya Vempaty, Elmsford, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 177 days.

(21) Appl. No.: 15/257,843

(22) Filed: Sep. 6, 2016

(65) Prior Publication Data

US 2018/0068576 A1 Mar. 8, 2018

(51) Int. Cl.
*G09B 5/00* (2006.01)
*G09B 5/12* (2006.01)
*G09B 7/00* (2006.01)

(52) U.S. Cl.
CPC ........ *G09B 5/12* (2013.01); *G09B 7/00* (2013.01)

(58) Field of Classification Search
CPC ... G09B 5/08; G09B 5/12; G09B 7/07; G09B 7/077
See application file for complete search history.

(56) References Cited

U.S. PATENT DOCUMENTS

| 7,677,896 | B1 | 3/2010 | Sonwalkar |
| 8,506,304 | B2 | 8/2013 | Conner |
| 8,699,939 | B2 | 4/2014 | German et al. |
| 2002/0098468 | A1 | 7/2002 | Barrett et al. |
| 2007/0099161 | A1 | 5/2007 | Krebs et al. |
| 2008/0038708 | A1 | 2/2008 | Slivka et al. |
| 2008/0138786 | A1 | 6/2008 | Redd et al. |
| 2010/0075289 | A1 | 3/2010 | Maher et al. |
| 2010/0159438 | A1* | 6/2010 | German ............ G06F 17/30525 434/433 |
| 2011/0117534 | A1* | 5/2011 | Berger ................ G09B 7/02 434/350 |

(Continued)

OTHER PUBLICATIONS

Katuk et al., "Finding an Optimal Learning Path in Dynamic Curriculum Sequencing With Flow Experience," International Conference on Computer Applications and Industrial Electronics, Jun. 2010, ISBN: 9781424490547.

*Primary Examiner* — Peter R Egloff

(74) *Attorney, Agent, or Firm* — Intelletek Law Group, PLLC; Gabriel Daniel, Esq.

(57) ABSTRACT

Techniques pertaining to automating generation of curricula for a class of students with blended-learning contents are presented. The blended-leaning contents provide common topics shared by all the students in a class as well as self-learning materials for sub-groups of the class. This approach creates curricula optimally attending to students with different interests and backgrounds. The course materials are selected by searching multiple external sources publically available while filtering the search results through inputs of the students and requirements set by the instructors. The course contents and schedules of the curricula are further optimized by organizing the filtered search results with respect to a set of constraints.

19 Claims, 7 Drawing Sheets

(56) References Cited

U.S. PATENT DOCUMENTS

| | | |
|---|---|---|
| 2013/0011821 A1 | 1/2013 | Denley |
| 2013/0280690 A1 | 10/2013 | Menon et al. |
| 2014/0024009 A1* | 1/2014 | Nealon .................. G09B 5/12 434/362 |
| 2014/0099626 A1 | 4/2014 | Kelly et al. |
| 2014/0193795 A1 | 7/2014 | Tavolacci et al. |
| 2014/0272889 A1* | 9/2014 | Kulkarni ................ G09B 5/08 434/350 |
| 2014/0342325 A1 | 11/2014 | Wu |

* cited by examiner

700

```
┌─────────────────────────────────────────────────────┐
│ INTEGRATE INPUT DATA FROM STUDENTS, INSTUCTOR(S),   │
│ AND SCHOOL(S) ACCORDING TO THE INSTRUCTIONS         │
│                        710                          │
└─────────────────────────────────────────────────────┘
                          │
                          ▼
┌─────────────────────────────────────────────────────┐
│        CONSTRUCT A COURSE BOUNDARY TO               │
│        DEFINE THE SCOPE OF THE COURSE               │
│                        720                          │
└─────────────────────────────────────────────────────┘
                          │
                          ▼
┌─────────────────────────────────────────────────────┐
│   DETERMINE THE COURSE CONTENTS WITHIN THE          │
│   COURSE BOUNDARY BY SEARCHING MULTIPLE SOURCES     │
│                        730                          │
└─────────────────────────────────────────────────────┘
                          │
                          ▼
┌─────────────────────────────────────────────────────┐
│         OPTIMIZE THE COURSE CONTENTS                │
│         WITH RESPECT TO CONSTRAINTS                 │
│                        740                          │
└─────────────────────────────────────────────────────┘
```

FIG. 7

AUTOMATIC LEARNING CURRICULUM GENERATION

BACKGROUND

Technical Field

The present disclosure generally relates to automatic generation of curricula for a class of students, and more particularly, to automatic generation of blended-learning course contents adapted to students with different interests and backgrounds.

Background

A traditional setting of education, typically involving an instructor teaching a class of students in a classroom on a particular subject, generally allows interactions between the instructor and the students. Such interactions are salient in several ways. The instructor can monitor the responses of students in the classroom and adjust the level of lecturing accordingly. The students can communicate to the instructor to reflect their level of understanding or seek help for various aspects of learning. The efficiency and quality of learning is the ultimate goal of the traditional setting of education. However, challenges of selecting an appropriate course content or defining proper course objectives arise for a class of students with diverse backgrounds and different interests. It is also rather difficult for a human teacher to search, select, and organize the best content from massive educational materials available on-line or from other digital resources without a computer-aided method. The traditional setting of education hence cannot span wide enough to cover the needs of all the students owing to such a fixed style of teaching and lack of variability of the course content. Students on either end of a performance spectrum, measured by testing students on the course content, are often ignored or forced to follow avenues inadequate to their levels in the traditional setting. Corrections have been attempted to solve this problem with a variety of one-on-one teaching methods but are either not efficient or limited to a very small scale. The inception of web-based learning in recent years has catalyzed some methodologies towards improving the learning experience of individual student with a free-form style and adaptive content, but this web-based format is not suitable for subjects, which require collaborative learning and communicative teacher-student relationships, and in settings that can require in-person interaction between students or between the student and the teacher.

SUMMARY

In the present disclosure, an approach of blended learning, which integrates the teaching of traditional classroom setting and self-learning of web-based format, is provided. This approach takes into consideration the diverse backgrounds and different interests of a class of students and utilizes publically and potentially privately available educational materials to automatically generate curricula for the students in a class. The curricula provide two different regimes of learning; one is a common course content shared by all the students in the class, and the other is a private course content that better attends to the background and interest of each student. The curricula are further optimized with respect to a set of constraints to fit the course content length into a predetermined number of sessions.

According to one embodiment of the present disclosure, a method of automatic learning curriculum generation is provided for a class of students. The input data from users including a class of students, one or more instructors, one or more educational institutions, is received by one or more processors. The input data describes a variety of aspects concerning a course and attributes of students attending the course. The users also provide a set of instructions for the processing of the respective input data. A course boundary is constructed by one or more processors based on the input data. The course boundary comprises a plurality of topics for the class of students to define the scope of the course. A plurality of blended-learning contents pertaining to the course boundary are determined by the one or more processors to provide a set of common topics for the class as a whole and a plurality of sets of private topics for each of the sub-groups respectively, wherein each of the sub-groups comprises at least one of the students in the class. The curricula based on the blended-learning contents for each of the sub-groups of the class are further optimized by the one or more processors with respect to a set of constraints.

According to another embodiment of the present disclosure, an apparatus is provided. The apparatus comprises one or more processers configured to receive the input data and a plurality of instructions and automatically generate curricula, the one or more processors comprising: (1) an assessor unit configured to integrate input data from a group of users and store the input data, wherein the group of users comprise one or more instructors, a class of students attending a course, and one or more educational institutions; (2) a searcher unit configured to search for a collection of course materials pertaining to the course from a plurality of sources, wherein the sources comprise a collection of substances from the one or more instructors, a plurality of institutional repositories, and a collection of educational databases publicly available; (3) an analyzer unit configured to determine a plurality of blended-learning contents for a plurality of sub-groups of the class respectively, wherein the plurality of blended-learning contents comprise a plurality of common topics for the class as a whole and a plurality of private topics for each of the sub-groups in the class from output of the searcher, and wherein each of the sub-groups comprises at least one of the students in the class; and (4) an optimizer unit configured to output a plurality of curricula based on the blended-learning contents for each of the sub-groups of the class, wherein the curricula are optimized with respect to a set of constraints.

BRIEF DESCRIPTION OF THE DRAWINGS

The drawings are of illustrative embodiments. They do not illustrate all embodiments. Other embodiments may be used in addition or instead. Details that may be apparent or unnecessary may be omitted to save space or for more effective illustration. Some embodiments may be practiced with additional components or steps and/or without all of the components or steps that are illustrated. When the same numeral appears in different drawings, it refers to the same or like components or steps.

FIG. 7 illustrates an example process that may generate optimized curricula for a class of students based on the input data received from students and instructors in accordance with an embodiment of the present disclosure.

DETAILED DESCRIPTION

In the following detailed description, numerous specific details are set forth by way of examples in order to provide a thorough understanding of the relevant teachings. However, it should be apparent that the present teachings may be practiced without such details. In other instances, well-known methods, procedures, components, and/or circuitry have been described at a relatively high-level, without detail, in order to avoid unnecessarily obscuring aspects of the present teachings.

The present disclosure generally relates to a method and apparatus of automatic generation of curricula for a class of students, and more particularly, to the creation of adaptive course contents suitable for students with different interests and backgrounds. A method according to various embodiments of the present disclosure automatically integrates course materials from public educational domain regarding attributes and requirements from students and instructor(s) to generate curricula that accommodate a wide range of diversity of students with adaptive blended-learning contents. The proposed approach of the present disclosure is based on blended learning with certain contents taught in groups and certain contents taught individually. What is taught in groups may be adapted based on a variety of factors such as, for example and not limited to, the interests and profiles of a set of students registered for a given course, current job market requirements, and contents available in multiple other forms for consumption. The proposed approach may automatically integrate data from multiple sources, including information about the students in the class, in creating an improved learning curriculum for a given subject at hand. What can be achieved by the proposed approach of the present disclosure could not be achieved before since large-scale, organized and automated access to education and job market information (outside of information available in a classroom), as well as teaching materials, was not available.

Example Schemes

Figure 1:
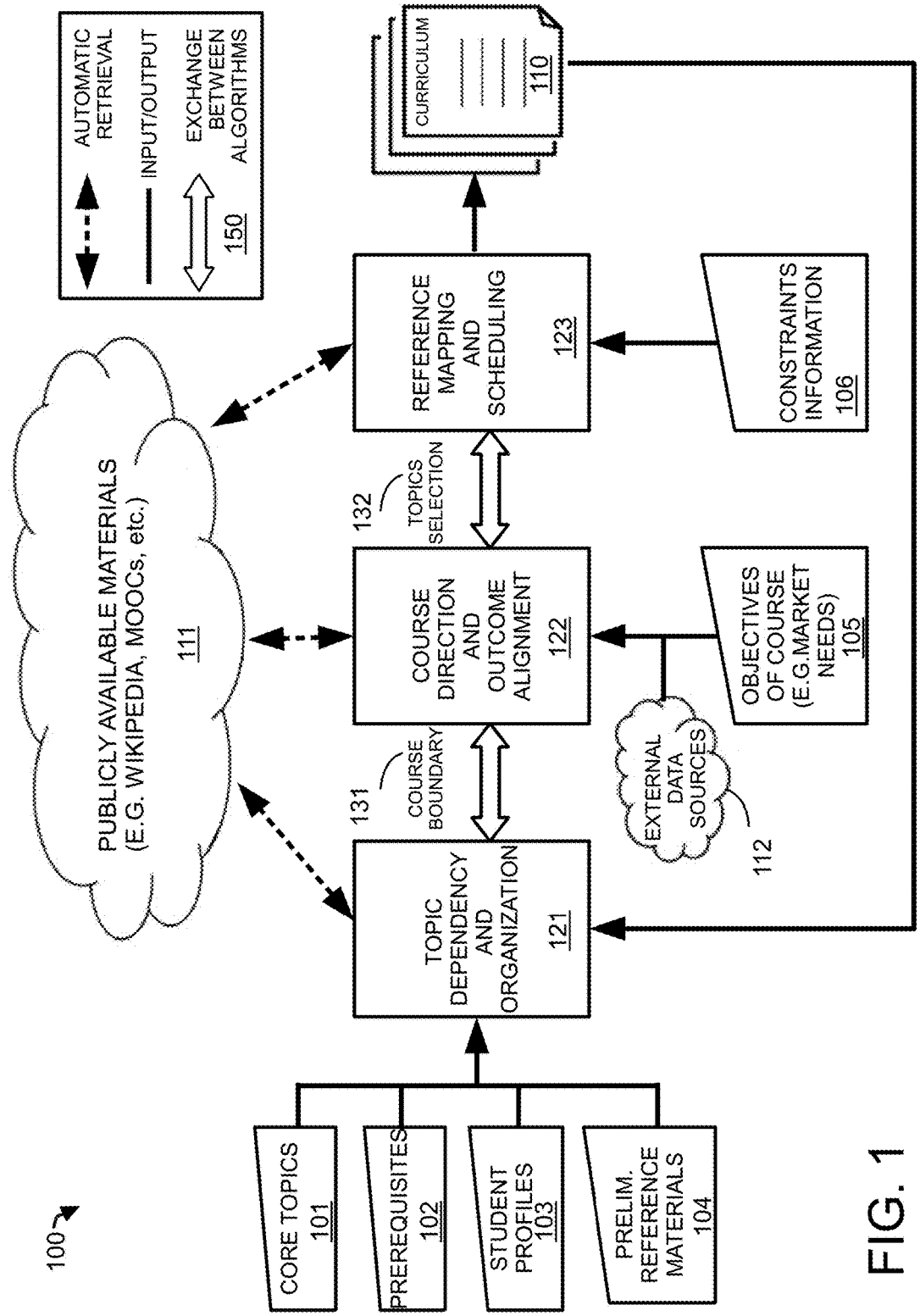
FIG. 1 is a block diagram of an example scheme in which various embodiments in accordance with the present disclosure may be implemented.

FIG. 1 depicts an example scheme 100 in which various embodiments in accordance with the present disclosure may be implemented. The example scheme 100 may include one or more operations, actions, or functions as represented by one or more of blocks 101-106, 111, 112 and 121-123. Although illustrated as discrete blocks, various blocks of scheme 100 may be divided into additional blocks, combined into fewer blocks, or eliminated, depending on the desired implementation.

Blocks 101-106 may be referred to as input data blocks, with each block representing a type of input data. Input data blocks in the example shown in FIG. 1 include the following: core topics block 101, prerequisites block 102, student profiles block 103, preliminary reference materials block 104, objectives of course block 105, and constraints information block 106. Core topics block 101 may represent the fundamental substances of a course. Prerequisites block 102 may represent subjects required to be known or otherwise learned by the students before attending the course. Student profiles block 103 may represent information related to the backgrounds, grades, and interests of students. Preliminary reference materials block 104 may represent previous lecture notes, textbooks, and articles related to a course. Objectives of course block 105 may represent career goals of students. Constraints information block 106 may represent availability of faculties, teaching assistants, classrooms, number of sessions, or a combination thereof, for a course. Blocks 121-123 may be processing blocks, with each block processing input data and performing particular tasks. Topic dependency and organization block 121 may organize dependency of preliminary course topics. Course direction and outcome alignment block 122 may search additional materials to decide course topics and knowledge covered in a course according to the objectives of course block 105. Reference mapping and scheduling block 123 may map different course materials to the respective student(s) and optimize the class schedule with respect to constraint information. Blocks 111 and 112 may be database blocks, with block 111 representing publicly available materials on the internet, and block 112 representing social media or employment market information. Curricula Block 110 may represent a number of curricula for a class of students. Block 150 is a legend block.

The example scheme 100 may utilize a number of processing blocks 121-123 to retrieve course materials from database blocks 111 and 112 by analyzing input data blocks 101-105. Each of the processing blocks 121-123 may perform particular tasks individually but may be also be able to exchange algorithms and information with one another to collaboratively accomplish a targeted task. The legend block 150 depicts various symbols representing different behaviors of communications between blocks. For instance, the topic dependency and organization block 121 may organize a number of preliminary course topics and dependency between preliminary course topics based on both the input data blocks 101-104 and search results from database block 111. The course direction and outcome alignment block 122 may align course materials retrieved from database block 111 and database block 112 to the objectives from the objectives of course block 105. The topic dependency and organization block 121 and course direction and outcome alignment block 122 may exchange algorithms and information for the determination of a course boundary 131 that refines the preliminary course topics and related course materials, taking information from input data 101-105 into account. The reference mapping and scheduling block 123 may interact with course direction and outcome alignment block 122 to determine course contents and perform optimization on the course contents with respect to the constraint information block 106. The reference mapping and scheduling block 123 may output curricula 110 for a class of students, with each curriculum of curricula 110 including a blended-learning content adapted to the objectives of the students and instructor(s). In some embodiments, the generated curricula 110 may be used as input data for topic dependency and organization block 121 to generate a series of curricula for a sequence of courses.

Referring to FIG. 1, various forms of input data blocks 101-104 from students and instructor(s) may be utilized in the assessment of various aspects of students to determine preliminary course topics pertaining to the objectives of the course. The preliminary course topics may include core topics necessary for the course and non-core topics of relevant interests or prerequisites. In one embodiment, the core topics 101 may be indicated by the instructor(s) as fundamental substances of the course, and the prerequisites 102 may also be indicated by the instructor(s) as requirements for the course. For illustrative purposes and without limitation, the student profiles 103 may include a variety of attributes associated with the interest of students, prior courses taken by the students, test performance of the students, and responses to questionnaires of course-related subjects. In some embodiments, the preliminary reference materials 104 may be generated as input for the topic dependency and organization block 121 using Natural Language Processing of previous textbooks or lecture notes, provided by the instructor(s) or automatically selected from database block 111.

In some embodiments, the input data 101-103 may be analyzed and integrated by the topic dependency and organization block 121 to determine a number of preliminary course topics and dependency between preliminary course topics. Test performance of the students may be ranked to determine a level of difficulty of the course materials. The number of students interested in a particular topic may be calculated to provide a course direction. Course materials relevant to the preliminary course topics may be gathered in topic dependency and organization block 121 by performing searches from preliminary reference materials block 104 and database block 111. The topic dependency and organization block 121 may also perform clustering of students into sub-groups according to a particular attribute of student profiles 103. In one embodiment, students with a similarity of interest and having taken the same prerequisites may be grouped together. Such a clustering instruction may be provided by the instructor(s).

The objectives of course block 105 may include the learning objectives of the students or outcomes expected by the instructor(s). Students may wish to learn more relevant materials associated with the core topics for preparing an advanced level of graduate study or simply more practical tutorials of the non-core topics that may increase opportunities in the employment market. The instructor(s) may expect students to pass certain tests or obtain certificates as the outcome of the course. The course direction and outcome alignment block 122 may analyze the input data 105 and retrieve pertinent information from database block 111 and database block 112 that is aligned to the objectives of course block 105.

The database block 111 may refer to public educational materials available on the internet. There are a number of public databases providing educational contents such as Wikipedia™ and Massive Open Online Courses (MOOCs). Other sources may include repositories of educational institutions, journals of academic societies, conference proceedings in certain disciplines, and white papers from corporate publication. The public educational materials mentioned above is for illustration purposes, and is not intended to be exhaustive or limited to the present disclosure. The database block 112 may generally relate to emerging views or trending topics of the employment market, status of economy, news, or social media that may have indicated new skills required for a given profession or a promising new field of research.

The constraints information block 106 may include information regarding time constraints and teaching resource constraints. A time constraint may be a limit of the length of the course, which may be defined as a product of a predetermined number of sessions and a predetermined number of hours per session. The length of the course may be further divided into a common course length and a private course length with a predetermined ratio. In some embodiments, the predetermined numbers for sessions, hours per session, and ratio of the common course length to the private course length may be configurable. The common course length may refer to the number of scheduled sessions available for the class as a whole, while the private course length is the number of the sessions available for self-learning. The teaching resource constraints may involve the number of faculties, the number of teaching assistants, and classroom facilities that are available for the course, or internet access that is available for the students.

The search results of the course materials within the course boundary 131 may be further filtered with respect to the constraints information 106. The reference mapping and scheduling block 123 may perform filtering and optimization among the search results to select appropriate contents that fit into the time and teaching resource constraints. In some embodiments, the reference mapping and scheduling block 123 may also collaborate with course direction and outcome alignment block 122 for the selection of the non-core topics and mapping of non-core topics to the sub-groups of students, subject to the relevancy between the non-core topics and the objectives of the sub-groups of students. The output of the reference mapping and scheduling block 123 may be curricula 110, which may include the common topics for the class as a whole and sets of private topics for each of the sub-groups of the class.

Example Process

Figure 2:
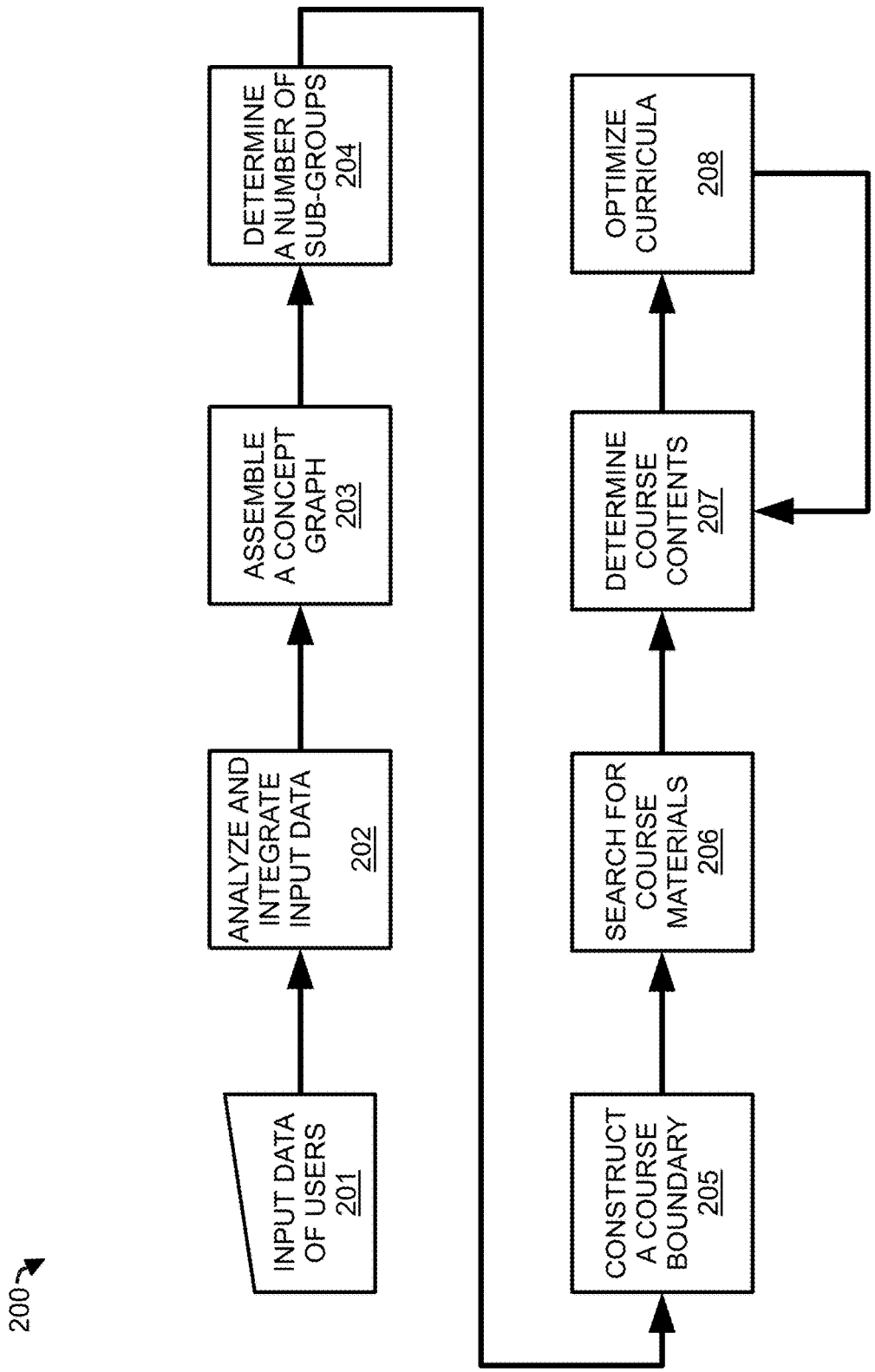
FIG. 2 is a block diagram of an example process in accordance with an embodiment of the present disclosure.

FIG. 2 depicts an example process 200 in accordance with an embodiment of the present disclosure. Process 200 may include one or more operations, actions, or functions as represented by one or more of blocks 201, 202, 203, 204, 205, 206, 207 and 208. Although illustrated as discrete blocks, various blocks of process 200 may be divided into additional blocks, combined into fewer blocks, or eliminated, depending on the desired implementation.

Process 200 may start at 201, where users may enter data as input for the following steps. The users herein may refer to students attending a course, instructor(s) (may include the teaching assistant) teaching the course, and school(s) providing information of students. At 201, data may be entered manually or retrieved automatically with a set of instructions specified by the students or instructor(s). The input data may include a variety of attributes of students such as the interest of students, prior courses taken by the students, test performance of the students, learning objectives of the students, and responses to questionnaires of course-related subjects. In one embodiment, the instructor(s) may set the requirements of prerequisites for the course, and provide core topics and possible topics of interest for the students. Course materials like previous lecture notes, video sessions, reference books, or constraints information of the course may serve as input data at 201. The input data 201 may include a set of instructions for how to process the input data.

At 202, the input data 201 may be analyzed to establish a concept graph 203. The concept graph 203, which defines directions and dependency of course topics, may include a number of preliminary course topics. In one embodiment, the preliminary course topics in the concept graph 203 may be provided by the instructor(s), and may include core topics necessary for the course and non-core topics such as prerequisites or relevant topics of interest. The input data 201 may be further assessed to determine a number of sub-groups of the students at 204. The clustering of students may be determined by a similarity of student background, a similarity of test performance, a similarity of interest, or a similarity in career goals from instructions of the input data 201, or a mixture of these criteria. In another embodiment, students may also be clustered, for example, by the κ-means algorithm on a numeric vector where each entry represents an observation. The entry may be 1 if the student has that observation, and 0 otherwise. Other clustering algorithms based on a similarity of a particular attribute of the students may also be applied. Alternatively, the sub-groups may be pre-defined by the instructor(s) or by the students themselves. Each of the sub-groups may include at least one or more students of the class.

Once the concept graph 203 is established and the students are divided into sub-groups based on a similarity of an attribute from the input data of students, process 200 may proceed to 205 to construct a course boundary. At 205, process 200 may examine the preliminary course topics against the input data 201 about whether or not to exclude one or more of the non-core topics or to include additional relevant topics. For instance, in some embodiments, a prerequisite may be excluded if 80% of students in the class have taken similar subject of that prerequisite. As another example, a relevant topic may be added to the course boundary 205 if 33% of students in the class are interested. The threshold used for excluding or including a topic may be predetermined in the instructions received from the instructor(s). The course boundary 205 may be, therefore, a confined scope of the course materials for the students after taking into consideration the input data 201.

In some embodiments, the course materials pertaining to the course boundary may be collected from multiple sources at 206 with a default web-search engine or search API (Application Programming Interface). Various forms of course materials, such as lecture notes, slides, theses, white papers, journal articles, or video sessions, may exist in Wikipedia™, MOOCs, and other educational databases. A set of keywords may be generated automatically from the instructions of input data, such as descriptions and objectives of the course, to serve as search criteria. The search results may be ranked according to the meta-data such as on-line reviews, number of views per video, number of citations, number of references, or rating of the publisher. The search results may be tagged with traits indicating the ranking, the length, and the type of the course materials. The ranking method is described above. The length of the course materials may be the number of slides, the number of web-pages or pages, or the duration of a video. In one embodiment, the types of the course materials may have two varieties, with one being the common topics for the class as a whole and the other being the private topics for the sub-groups. In another embodiment, the types may be research-oriented (for students preparing for advanced levels) or skill-oriented (for students preparing for career opportunities). In another embodiment, the types may be static or dynamic, indicating that the course materials are either documents or slides (static), or videos (dynamic). For instance, the course materials related to the core topics and some of the non-core topics with shared interest of students may be categorized as the first type as the common topics for the whole class. The rest of the course materials pertaining to the non-core topics may be the second type as private topics for self-learning by the students.

At 207, a predetermined number of the course materials for the common topics and the private topics, respectively, may be determined or otherwise chosen from the search results (output of 206) after further relevancy analysis of the search results with respect to the course boundary. The predetermined number of the course materials chosen for either the common topics or the private topics may be configured in the instructions from the instructor(s). Mapping of sets of private topics to each of sub-groups according to the attributes of the input data 201 may also be performed at 208 in optimizing the curricula. For example, students preparing for an advanced graduate-level course may be associated with course materials with a research-oriented tag, whereas students looking for employment opportunities may be associated with course materials with a skill-oriented tag. Process 200 may then proceed to optimize the curricula with respect to the time constraint of input data 201 to fit the chosen course materials to the common course length and the private course length respectively. If more than one of the course materials may satisfy the constraints, the lower ranked course materials may be dropped. Ultimately, if no clear course material is better, any of the course materials may be dropped at random. In one embodiment, a given curriculum may be generated by combining the common course schedule, the private course schedule, a predetermined number of assignments, a predetermined number of projects, and a predetermined number of exams.

Example Apparatus and Graphs

Figure 3:
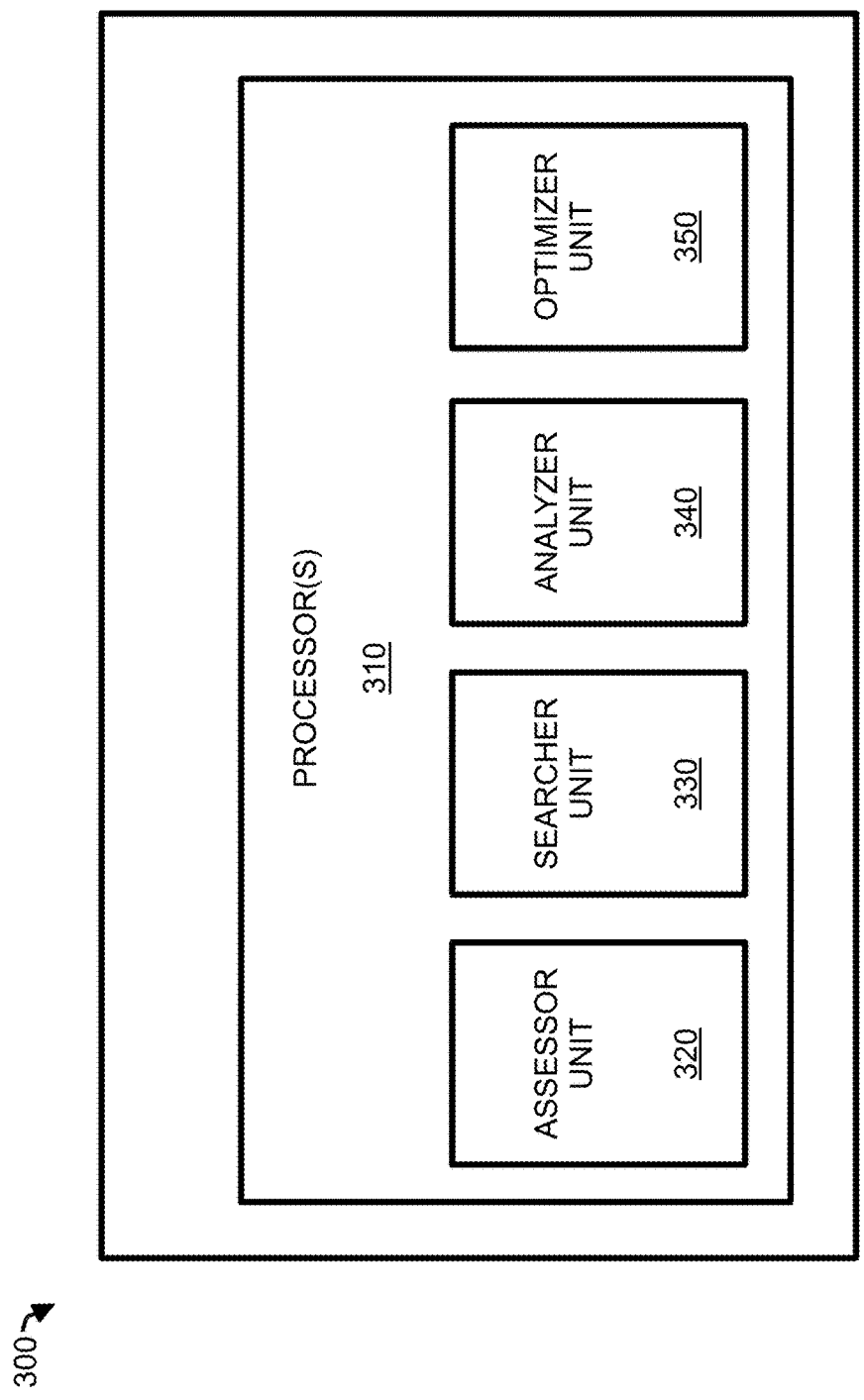
FIG. 3 is a block diagram of an example apparatus that may provide curricula for a class of students, consistent with an embodiment of the present disclosure.

FIG. 3 depicts an example apparatus 300 that may provide curricula for a class of students, consistent with an embodiment of the present disclosure. Apparatus 300 may be implemented in the form of one or more computing devices including, for example and not limited to, one or more servers, one or more desktop computers, one or more laptop computers, one or more tablet computers, one or more smartphones, one or more portable devices, one or more wearable devices, or any combination thereof. Apparatus 300 may include one or more processors 310. The processor(s) 310 may further include an assessor unit 320, a searcher unit 330, an analyzer unit 340, and an optimizer unit 350. In some embodiments, the assessor unit 320, the searcher unit 330, the analyzer unit 340, and the optimizer unit 350, may be implemented as an individual processor by itself.

Processor(s) 310 may receive input data and instructions from users, where the users refer to students attending a course and instructor(s) teaching the course. The processor(s) 310 may also retrieve a set of information about students from school(s) where the students attend, a set of information about the classroom facilities, or a set of employment information related to the skills learned in the course upon receiving the instructions for extraction. In some embodiments, the instructor(s) may draft up questionnaires concerning particular aspects of a subject and enter questionnaires to the processor(s) 310, the processor(s) 310 may deliver questionnaires to the email boxes of students and collect the responses electronically. In still another embodiment, the processor(s) 310 may take previously generated curricula of a prerequisite as input to automatically generate course content for the next course in a sequence of related courses.

The assessor unit 320 may communicate to processor(s) 310 to process the input data according to the instructions from users. The assessor unit may analyze the input data to classify, rank and calculate various attributes of the students. For instance, the assessor unit 320 may rank the test performance of the students to determine a level of difficulty of the course materials. The assessor unit 320 may also classify the career goals of the students as preparing for advanced level or looking for employment opportunities.

The assessor unit 320 may also perform assembly of a concept graph to organize directions and dependency of preliminary course topics. In some embodiments, the preliminary course topics may be provided by the instructor(s) entering as an input. But the assessor unit 320 may also recommend additional topics in the concept graph based on analysis of the attributes of the students from the input data. For instance, a relevant topic may be added to the concept graph if 33% of students in the class are interested. The assessor unit 320 may also decide to remove one or more preliminary topics from the concept graph, e.g., a prerequisite may be excluded if 80% of students in the class have taken similar subject of that prerequisite. A course boundary may be established after refining the concept graph at assessor unit 320.

In one embodiment, the students may be assessed and clustered by the assessor unit 320 based on similarities of attributes of the students from the input data. For instance, the students may be grouped into sub-groups according to a similarity of background or test performance. In another embodiment, students may be divided into sub-groups based on the entries to questionnaires by the κ-means algorithm on a numeric vector where each entry may represent an observation, the entry may be 1 if the student has that observation, and 0 otherwise.

The searcher unit 330 may communicate with the assessor unit 320 and the analyzer unit 340 to receive instructions for performing searches. In some embodiments, the searches may be performed with a set of keywords generated automatically from the instructions of the input data, such as descriptions and objectives of the course, to serve as search criteria.

The search results may be ranked and categorized by the analyzer unit 340. In some embodiments, the ranking may be determined by the meta-data such as on-line reviews, number of views per video, number of citations, number of references, or rating of the publisher. The search results may be tagged by the analyzer unit 340 with traits indicating the ranking, the length, and the type of the course materials. In some embodiments, the analyzer unit 340 may further choose a predetermined number of the course materials from the search results for optimization with respect to the constraints.

The optimizer 350 may determine mapping of sets of the private course topics to each of the sub-groups according to attributes of the students from the instructions of the input data. For instance, course materials for a prerequisite may be included in the curriculum of a sub-group of students who indicate lacking the background of the prerequisite in the respective attribute. In some embodiments, the optimization may be an iterative process by successively fitting the course materials to a predetermined common course length and a predetermined private course length, respectively. The optimizer 350 may decide to drop course materials randomly if more than one course materials satisfy the constraints and none is clearly better than the other. In some embodiments, the instructor(s) may allocate a predetermined portion of the course length for a specific type, e.g., the dynamic course materials (videos), to adjust optimization results. The optimizer 350 may deliver optimized curricula to the students electronically.

Figure 4:
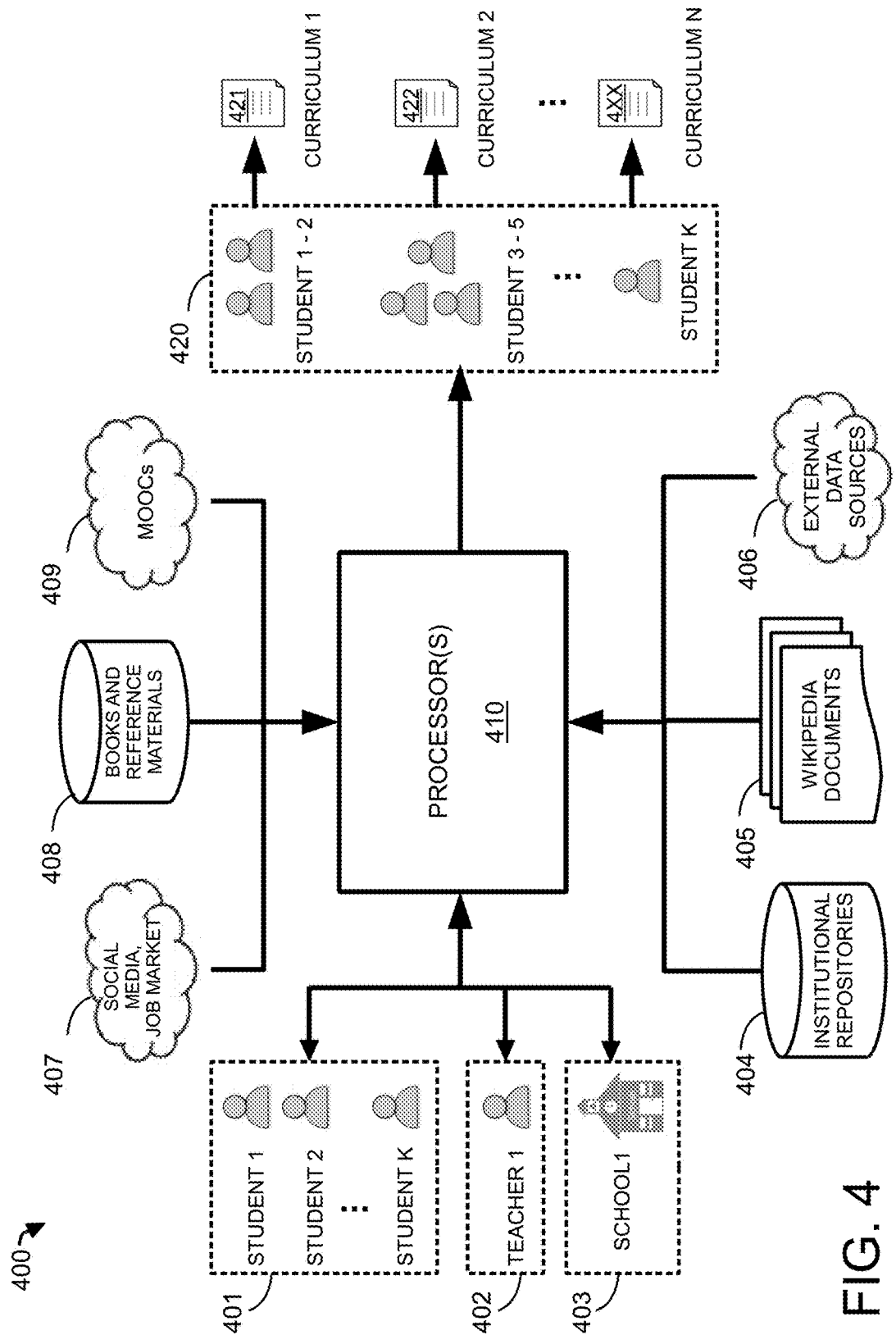
FIG. 4 is a block diagram of an example scenario of generation of curricula for a class of students utilizing the example apparatus, consistent with an embodiment of the present disclosure.

FIG. 4 depicts an example scenario 400 of generation of curricula for a class of students utilizing the example apparatus, consistent with an embodiment of the present disclosure. The one or more processors 410 may be an example implementation of the one or more processors 310. Therefore, detailed description above with respect to the one or more processors 310 applies to the one or more processors 410. Accordingly, in the interest of brevity, a detailed description of the one or more processors 410 is not provided to avoid redundancy.

FIG. 4 depicts an example graph for automatic generation of a plurality of curricula for a class of students 401 utilizing processor(s) 410 to integrate data from multiple sources, such as web-based databases, institutional repositories, and input data of users. The users may include a class of students 401 (Student 1, Student 2, . . . , Student K, with K a positive integer greater than 1) attending a course, an instructor 402 (Teacher 1) teaching the course, and school 403 (School 1) where the students attend the course. The processor(s) may receive the input data of users. The processor(s) 410 may further analyze the input data of users and may deliver questionnaires to the users based on the analysis results. In one embodiment, the processor(s) 410 may perform clustering of the students into sub-groups (N groups with N a positive integer) based on similarities of attributes from the input data of students 401. A class of students 401 may be divided into N sub-groups with each sub-group having at least one or more students as illustrated by block 420. The process(s) 410 may also perform searches for information related to the course from web-based sources 404-409 such as MOOCs, Wikipedia™, and social media. The processor(s) 410 may further perform ranking, tagging, and optimization of the search results to generate a plurality of curricula 421-4XX for each of the sub-groups respectively. The optimization may be performed with respect to constraints. The constraints may be entered as input data by the instructor 402 or may be retrieved from school 403.

Example Scenarios

Figure 5:
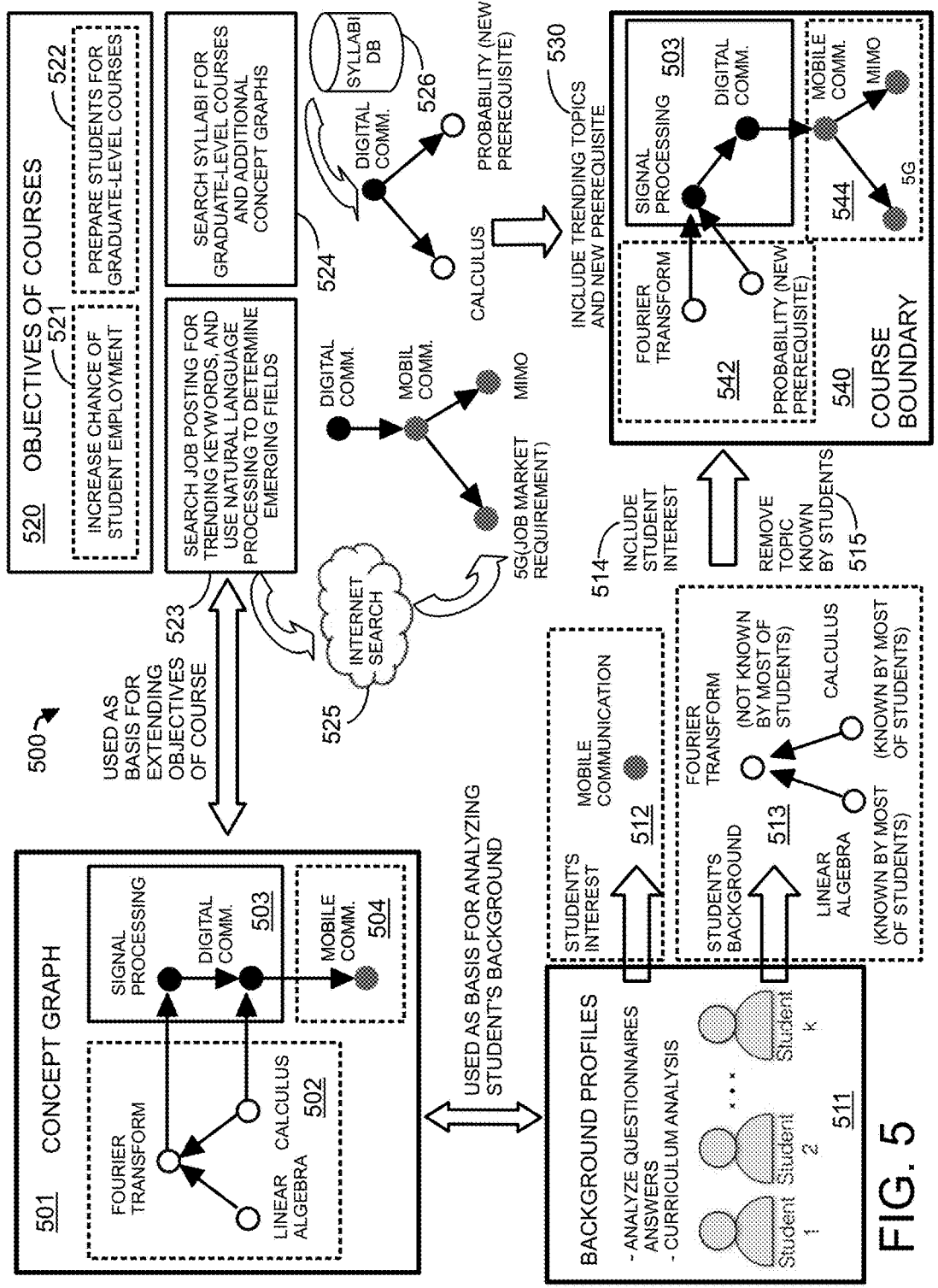
FIG. 5 is a diagram of an example scenario of constructing a course boundary in accordance with an embodiment of the present disclosure.

FIG. 5 depicts an example scenario 500 of constructing a course boundary in accordance with an embodiment of the present disclosure. The example scenario 500 may start with a concept graph 501 including preliminary course topics. In one embodiment, the concept graph 501 may be provided by the instructor(s). The preliminary course topics in the concept graph 501 may include core topics 503 (Signal Processing and Digital Communications) and non-core topics. The non-core topics may be further categorized as prerequisites 502 (Fourier Transform, Linear Algebra, and Calculus) and topics of interest 504 (Mobile Communication). The core topics 503 are indicated by solid black dots, the prerequisites 502 are indicated by hollow circles, and the topics of interest are indicated by grey dots. The dependency between the preliminary course topics is indicated by the arrows with the dependent (prerequisite) at the origin of an arrow. For example, the two prerequisites of Digital Communications are Signal Processing and Calculus, whereas Digital Communications is a prerequisite of Mobile Communication.

The concept graph 501 serves as a basis for the scope of the course to offer. The scope may be adjusted depending on the attributes of students. At 511, the backgrounds of the students may be analyzed to determine whether to include or exclude each of the non-core topics. In one embodiment, the analysis may be done with a set of questionnaires. For instance, at 512, the Mobile Communication may be included once the students interested in the Mobile Communication have exceeded a predetermined threshold. In another embodiment, the students may be classified by the knowledge of prerequisites 502 according to the background data. As indicated at 513, Linear Algebra and Calculus are known by most of the students (exceeding a predetermined threshold) and are excluded from the concept graph 501. Also at 513, Fourier Transform is not known by most of the students (not exceeding a predetermined threshold) and is not excluded. The scope of the concept graph 501 may also be adjusted according to the objectives of course 520 from the students. In still another embodiment, the objective of the course 520 from the students may include the following: (1) increase a chance for employment 521, and (2) prepare students for graduate-level courses 522. The processor(s) (not shown in FIG. 5) work in the background to perform searches 523 and 524 for the respective objectives 521 and 522. The searchable domains may include internet search 525 or syllabi database 526. The internet search 525 for the objective 521 may be performed by using Natural Language Processing techniques to determine emerging fields or by trending keywords in job requirements based on the scope of the concept graph 501. As illustrated in FIG. 5 concerning the internet search 525 for the objective 521, 5G and MIMO are the two course topics that may be most related to the technical field of Digital Communications and Mobile Communications. The syllabi database search 526 may be focused on the dependency of graduate-level course materials in the syllabi databases. For the objective 522, Probability may be identified to be essential for a number of graduate-level courses, thereby, Probability may be defined as a new prerequisite for students preparing for graduate-level courses. Combining actions at 514, 515, and 530, a course boundary 540 may be constructed after taking into consideration of background profiles 511 and objectives of the course 520 from students. The course boundary 540 now includes different contents compared to those in the concept graph 501. The course boundary 540 may include new non-core topics 542, 544, and the same core topics 503 (Signal Processing and Digital Communication). At 542, a new prerequisite (Probability) may be added, Linear Algebra and Calculus may be removed. At 544, two new topics of interest MIMO and 5G may be added.

Figure 6:
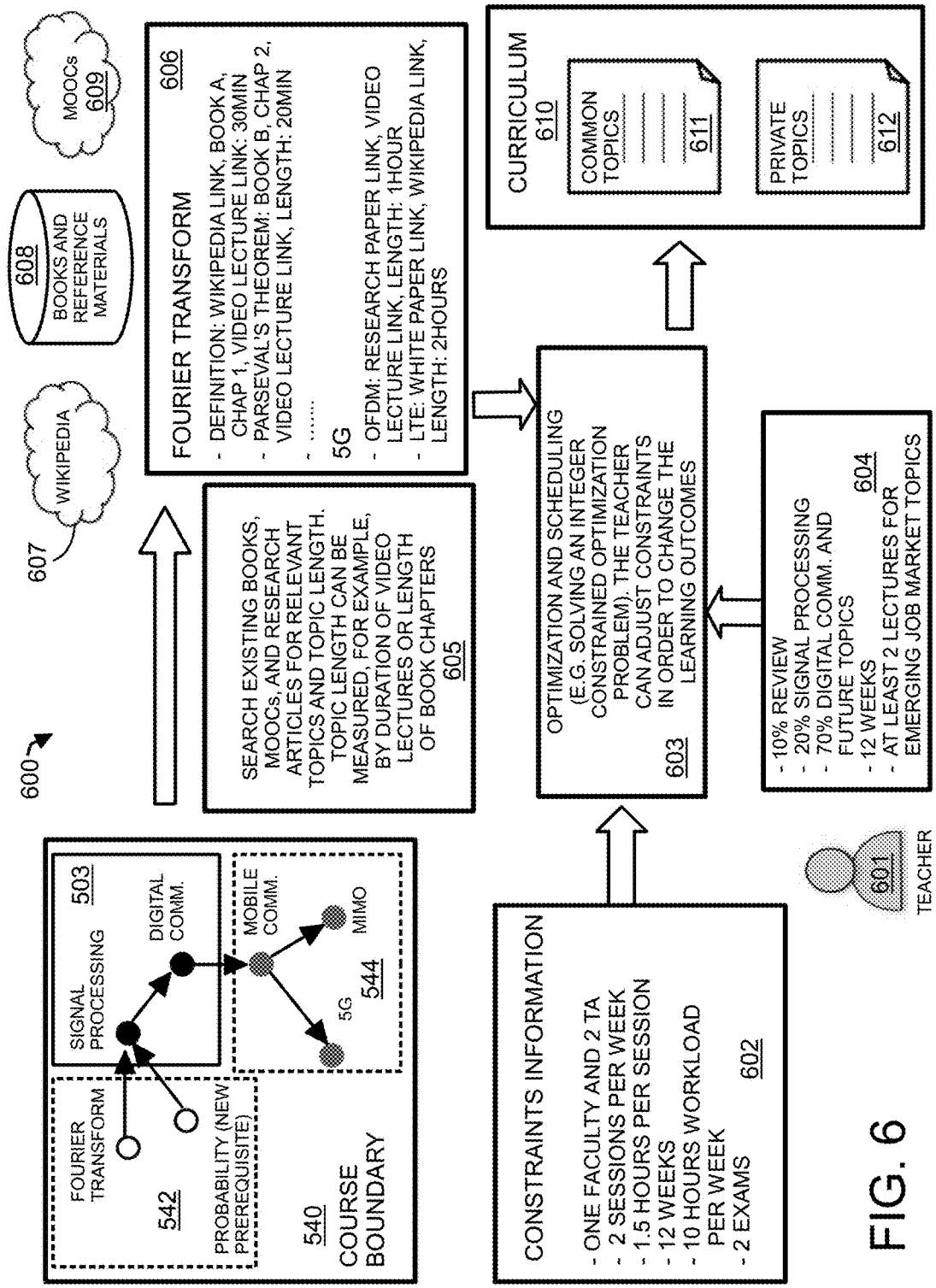
FIG. 6 is a diagram of an example scenario of determining a plurality of blended-learning contents based on the course boundary in accordance with an embodiment of the present disclosure.

FIG. 6 depicts an example scenario 600 of determining a plurality of blended-learning contents based on the course boundary in accordance with an embodiment of the present disclosure. Example scenario 600 may start with the course boundary 540 constructed according to one embodiment of the present disclosure. The course boundary 540 has been described extensively in the previous paragraph. Once the course boundary 540 is defined, the course materials pertaining to the course boundary may be collected by actions performed in block 605, which searches multiple sources such as MOOCs 609, books and references 608 (which may be stored in institutional repositories), and Wikipedia™ 607 out of a non-comprehensive list of internet-accessible sources. The course materials may include static forms like lecture slides, theses, white papers, journal articles, or dynamic forms like video sessions. The search results of block 605 may be ranked according to meta-data such as on-line reviews, number of views per video, number of citations, number of references, or rating of the publisher. The search results of block 605 may be tagged with traits indicating the ranking, the length, and the type of the course materials. A predetermined number of the course materials may be chosen from the search results of block 605 after further relevancy analysis of the search results with respect to the course boundary. Block 606 depicts an example of summarized traits of the course materials collected after actions performed by block 605. Two course topics in the boundary graph are concerned at 606, Fourier Transform and 5G. The first course material for the definition of Fourier Transform may be found from a Wikipedia™ link, which points to chapter 1 of Book A, and it may be a video lecture with a duration of 30 minutes. The second course material for Fourier Transform regarding to Parseval's theorem is located on chapter 2 of Book B, also a video lecture with a duration of 20 minutes. Similar observations may be made for the course materials collected for the course topic 5G at 606, and will not repeat here for brevity.

Block 602 depicts an example list of constraints information. In one embodiment, the constraints information may be provided by the instructor(s). At 603, optimization may be performed to arrange the course materials at 606 to satisfy the constraints at 602. The optimization procedure of this type may involve solving a system of equations with variables being constrained to integer values. In some embodiments, the optimization may be performed separately to generate a blended-learning curriculum 610 including a schedule 611 for the common topics and a schedule 612 for the private topics respectively. In some embodiments, the teacher 601 may allocate a portion of the course schedule for specific topics to increase flexibility. At 604, the teacher 601 may specify 10% of the course schedule for review, 20% of the schedule for Signal Processing, 70% of the schedule for Digital Communications and all other topics. Output information of block 604 may be taken into consideration by block 603 for further optimizing the course content to fit the adjusted schedule in addition to the constraints information of block 602. Thus the teacher 601 may change a portion of course schedule and quickly generate an optimized course content for different course objectives or learning outcomes.

Example Process

FIG. 7 depicts an example process of automatic generation of a blended-learning curricula for a class of students. Process 700 may include one or more operations, actions, or functions as represented by one or more of blocks 710, 720, 730, and 740. Although illustrated as discrete blocks, various blocks of process 700 may be divided into additional blocks, combined into fewer blocks, or eliminated, depending on the desired implementation. Process 700 may be implemented by apparatus 300 and any variations and/or derivatives thereof. Process 700 may be an example implementation of process 200, whether partially or completely. For illustrative purposes and without limitation, process 700 is described below in the context of apparatus 300. Process 700 may begin at block 710.

At 710, process 700 may involve assessor unit 320 of apparatus 300 integrating the input data according to the instructions received from the users. Process 700 may proceed from 710 to 720.

At 720, process 700 may involve assessor unit 320 constructing a course boundary to define the scope of the course. Alternatively, process 700 may involve assessor unit 320 and searcher unit 330 of apparatus 300 constructing a course boundary featuring publicly available materials obtained by searcher unit 330. Process 700 may proceed from 720 to 730.

At 730, process 700 may involve searcher unit 330 and analyzer unit 340 of apparatus 300 determining blended-learning course contents within the course boundary by searching multiple sources that are publically available. Process 700 may proceed from 730 to 740.

At 740, process 700 may involve analyzer unit 340 and optimizer unit 350 of apparatus 300 generating a plurality of curricula for each sub-group of students by optimizing the blended-learning course contents with respect to constraints. In some embodiments, the constraints may include two or more of the following: a number of instructors, a number of teaching assistants, a common course length, a private course length, and a number of office hours from the instructors and the teaching assistants. The common course length may be defined as a product of a number of scheduled common sessions and a number of planned hours per common session. The private course length may be defined as a product of a number of scheduled private sessions and a number of planned hours per private session.

In some embodiments, in integrating the input data from the group of users, process 700 may involve assessor unit 320 performing a number of operations. For instance, assessor unit 320 may receive the input data and instructions from the users, classify the input data according to the instructions, rank the input data according to the instructions, calculate the input data according to the instructions, and divide the students into the plurality of sub-groups according to the instructions.

In some embodiments, in integrating the input data according to the instructions received from the users, process 700 may involve assessor unit 320 classifying students according to an attribute of students (e.g. knowledge of a prerequisite). Another attribute (e.g., test performance) of students may be ranked according to the instructions. A different attribute (e.g., number of students interested in a particular topic) of the input data may be calculated for providing relevant course directions. The students may be divided into a number of sub-groups based on the classification or ranking results.

In some embodiments, in constructing the course boundary according to the input data of the users, process 700 may involve assessor unit 320 performing a number of operations. For instance, process 700 may involve assessor unit 320 assembling a concept graph of the course. The concept graph may include one or more core topics and a plurality of non-core topics provided by the one or more instructors. The non-core topics may include one or more prerequisites and one or more possible topics of interest. Moreover, for each of the non-core topics, process 700 may involve assessor unit 320 determining whether to exclude the respective non-core topic by analyzing the input data. The input data may include a collection of background profiles of the students and a set of requirements of the course. Furthermore, process 700 may involve assessor unit 320 determining whether to add one or more relevant topics to the concept graph by analyzing the input data. The input data may further include a set of objectives of the course. The one or more relevant topics may be associated with the objectives of the course.

In some embodiments, in constructing a course boundary to define the scope of the course, process 700 may involve assessor unit 320 assembling a concept graph including core topics and non-core topics. The core topics may be provided by the instructor(s). The non-core topics including prerequisite and topics of interest may also be provided by the instructor(s). Process 700 may also involve searcher unit 330 searching for non-core topics related to the attributes of students such as backgrounds, interests, or career goals.

Moreover, in constructing a course boundary to define the scope of the course, process 700 may further involve assessor unit 320 determining whether to exclude a non-core topic initially provided by the instructor(s) or search results performed according to some attributes of students. A questionnaire concerning each of the non-core topics may be received by the students. The responses to the questionnaire may be analyzed by the assessor unit 320. Predetermined thresholds for the respective non-core topics may be used to exclude a particular non-core topic if the corresponding threshold for that particular non-core topic is not met.

Alternatively or additionally, in constructing a course boundary to define the scope of the course, process 700 may further involve assessor unit 320 determining whether to include a relevant topic of interest from search results performed according to some attributes of students. A questionnaire concerning each of the relevant topic of interest may be received by the students. The responses to the questionnaire may be analyzed by the assessor unit 320. Predetermined thresholds for the respective relevant topic of interest may be used to include a particular topic if the corresponding threshold for that particular topic is exceeded.

In some embodiments, in determining whether to exclude the respective non-core topic by analyzing the input data, process 700 may involve assessor unit 320 performing a number of operations. For instance, process 700 may involve assessor unit 320 receiving a plurality of responses from the students concerning each of the non-core topics. Additionally, process 700 may involve assessor unit 320 assigning a plurality of thresholds for each of the responses concerning each of the non-core topics. Moreover, process 700 may involve assessor unit 320 comparing each of the thresholds with a corresponding response for the respective non-core topic to include the respective non-core topic when the threshold is exceeded or to exclude the respective non-core topic when the threshold is not exceeded.

Alternatively or additionally, in determining whether to add the one or more relevant topics to the concept graph by analyzing the input data, process 700 may involve assessor unit 320 performing a number of operations. For instance, process 700 may involve assessor unit 320 receiving a plurality of responses from the students concerning each of the objectives of the course. Additionally, process 700 may involve assessor unit 320 assigning a plurality of thresholds for each of the responses concerning each of the objectives of the course. Furthermore, process 700 may involve assessor unit 320 comparing each of the thresholds with a corresponding response for the respective objective of the course to include the respective relevant topic when the threshold is exceeded or to exclude the respective relevant topic when the threshold is not exceeded.

In some embodiments, in determining the plurality of blended-learning contents pertaining to the course boundary for the plurality of sub-groups of the class, respectively, process 700 may involve assessor unit 320 performing a number of operations. For instance, process 700 may involve assessor unit 320 amassing information pertaining to the course boundary by searching for a collection of course materials from a plurality of sources. The searching for the course materials from the sources may be performed using a set of keywords relevant to the one or more core topics and the non-core topics in the course boundary. Additionally, process 700 may involve assessor unit 320 determining a first set of the common topics from the amassed information pertaining to the course boundary. The first set of the common topics may be correlated with the one or more core topics. Moreover, process 700 may involve assessor unit 320 determining a plurality of first sets of the private topics from the amassed information pertaining to the course boundary for each of the sub-groups of the class. The plurality of the first sets of private topics may be correlated with the non-core topics. In some embodiments, the sources may include a collection of substances from the one or more instructors, a plurality of institutional repositories, and a collection of educational databases publicly available.

In some embodiments, in determining blended-learning course contents within the course boundary by searching multiple sources that are publically available, process 700 may involve searcher unit 330 searching multiple sources such as a collection of substances from instructor(s), a plurality of institutional repositories, and a collection of educational databases publicly available.

Alternatively or additionally, in determining blended-learning course contents within the course boundary by searching multiple sources that are publically available, process 700 may involve analyzer unit 340 determining a first set of common topics from the search results performed according to the scope of the course boundary. The first set of the common topics may be correlated with core topics and may be shared by all the students in a class.

Alternatively or additionally, in determining blended-learning course contents within the course boundary by searching multiple sources that are publically available, process 700 may involve analyzer unit 340 determining first sets of private topics for each of the sub-groups from the search results performed according to the scope of the course boundary. Each of the sets of the private topics may be correlated with non-core topics for the respective sub-group.

In some embodiments, in optimizing the plurality of curricula based on the blended-learning contents for the plurality of the sub-groups of the class with respect to the constraints, process 700 may involve optimizer unit 350 choosing a second set of the common topics from the first set of the common topics to fit within a common course length. Alternatively or additionally, process 700 may involve optimizer unit 350 choosing a second sets of the private topics from the first sets of the private topics to fit within a private course length. Alternatively or additionally, process 700 may involve optimizer unit 350 associating each of the second sets of the private topics to each of the students in the class. Alternatively or additionally, process 700 may involve optimizer unit 350 organizing a common class schedule based on the second set of the common topics for the class as a whole. Alternatively or additionally, process 700 may involve optimizer unit 350 organizing a plurality of private class schedules based on the second sets of the private topics for each of the sub-groups of the class. Alternatively or additionally, process 700 may involve optimizer unit 350 generating a plurality of curricula, each of which for a respective sub-group of the sub-groups of the class, by combining the common class schedule, each of the private class schedules, a number of assignments, a number of projects, and a number of exams.

The foregoing one or more embodiments facilitate the optimization of online learning techniques within a computer infrastructure by searching for a collection of course materials on-line from a plurality of sources publically available, classifying the search results according to the meta-data associated with the respective course materials, and determining the course contents with matched keywords via Natural Language Processing techniques. The computer-aided methods involved in these embodiments automatically search, select, and organize the appropriate course contents for students with diverse backgrounds or different needs to achieve their respective course objectives. Such tasks were not done by humans or machines before.

CONCLUSION

The descriptions of the various embodiments of the present teachings have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

While the foregoing has described what are considered to be the best state and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

The components, steps, features, objects, benefits and advantages that have been discussed herein are merely illustrative. None of them, nor the discussions relating to them, are intended to limit the scope of the present teachings. While various advantages have been discussed herein, it will be understood that not all embodiments necessarily include all advantages. Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

Numerous other embodiments are also contemplated. These include embodiments that have fewer, additional, and/or different components, steps, features, objects, benefits and advantages. These also include embodiments in which the components and/or steps are arranged and/or ordered differently.

Aspects of the present disclosure are described herein with reference to a flowchart illustration and/or block diagram of a method, apparatus (systems), and computer program products according to embodiments of the present disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing has been described in conjunction with exemplary embodiments, it is understood that the term "exemplary" is merely meant as an example, rather than the best or optimal. Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments have more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A computer implemented method, comprising:
   integrating, by a processor, input data from a group of users, wherein the users provide a plurality of instructions for processing the input data, and wherein the users comprise one or more instructors, a class of students attending a course, and one or more educational institutions;
   constructing, by the processor, a course boundary according to the input data of the users, wherein the course boundary comprises a plurality of topics of the course from the input data of the users;
   determining, by the processor, a plurality of blended-learning contents pertaining to the course boundary for a plurality of sub-groups of the class respectively by searching for a collection of course materials from a plurality of sources with a web-search engine or search Application Programming Interface (API), wherein the searching for the collection of course materials from the plurality of sources is performed using a set of keywords relevant to one or more core topics and a plurality non-core topics provided by the one or more instructors, wherein the blended-learning contents comprise a plurality of common topics for the class as a whole and a plurality of private topics for each of the sub-groups, and wherein each of the sub-groups comprises at least one of the students in the class; and
   optimizing, by the processor, a plurality of curricula based on the blended-learning contents for the plurality of sub-groups of the class with respect to a set of constraints,
   wherein the constructing of the course boundary according to the input data of the users comprises:
      assembling a concept graph of the course, wherein the concept graph comprises the one or more core topics and the plurality of non-core topics; and
      for each of the non-core topics, determining whether to exclude the respective non-core topic by analyzing the input data; and
   wherein the determining of whether to exclude the respective non-core topic by analyzing the input data comprises:
      receiving a plurality of responses from the students concerning each of the non-core topics;
      assigning a plurality of thresholds for each of the responses concerning each of the non-core topics; and
      comparing each of the thresholds with a corresponding response for the respective non-core topic to exclude the respective non-core topic when the threshold is not exceeded.

2. The method of claim 1, wherein the integrating of the input data from the group of users comprises:
   receiving the input data from the users;
   receiving the instructions from the users;
   classifying the input data according to the instructions;
   ranking the input data according to the instructions;
   calculating the input data according to the instructions; and
   dividing the students into the plurality of sub-groups according to the instructions.

3. The method of claim 1,
   wherein the non-core topics include one or more prerequisites and one or more possible topics of interest,
   wherein the constructing of the course boundary according to the input data further comprises determining whether to add one or more relevant topics to the concept graph by analyzing the input data,
   wherein the input data further comprises a set of objectives of the course, and
   wherein the one or more relevant topics are associated with the objectives of the course.

4. The method of claim 3, wherein the determining of whether to add the one or more relevant topics to the concept graph by analyzing the input data comprises:
   receiving a plurality of responses from the students concerning each of the objectives of the course;
   assigning a plurality of thresholds for each of the responses concerning each of the objectives of the course; and
   comparing each of the thresholds with a corresponding response for the respective objective of the course to include the respective relevant topic when the threshold is exceeded or to exclude the respective relevant topic when the threshold is not exceeded.

5. The method of claim 1, wherein the determining of the plurality of blended-learning contents pertaining to the course boundary for the plurality of sub-groups of the class, respectively, comprises:
   determining a first set of the common topics from the amassed information pertaining to the course boundary, wherein the first set of the common topics are correlated with the one or more core topics; and
   determining a plurality of first sets of the private topics from the amassed information pertaining to the course boundary for each of the sub-groups of the class, wherein the plurality of first sets of private topics are correlated with the non-core topics.

6. The method of claim 5, wherein the sources comprise a collection of substances from the one or more instructors, a plurality of institutional repositories, and a collection of educational databases publicly available.

7. The method of claim 1, wherein the constraints comprise two or more of the following:
   a number of instructors;
   a number of teaching assistants;
   a common course length, wherein the common course length is defined as a product of a number of scheduled common sessions and a number of planned hours per common session;
   a private course length, wherein the private course length is defined as a product of a number of scheduled private sessions and a number of planned hours per private session;
   a number of office hours from the instructors and the teaching assistants; and
   a number of hours for out-of-classroom learning activities related to the course.

8. The method of claim 1, wherein the optimizing of the plurality of curricula based on the blended-learning contents for the plurality of the sub-groups of the class with respect to the constraints comprises:
   choosing a second set of the common topics from the first set of the common topics to fit within a common course length;
   choosing a plurality of second sets of the private topics from the first sets of the private topics to fit within a private course length;
   associating each of the second sets of the private topics to each of the students in the class;
   organizing a common class schedule based on the second set of the common topics for the class as a whole;
   organizing a plurality of private class schedules based on the second sets of the private topics for each of the sub-groups of the class; and
   generating a plurality of curricula, each of which generated for a respective sub-group of the sub-groups of the class, by combining the common class schedule, each of the private class schedules, a number of assignments, a number of projects, and a number of exams.

9. The method of claim 1, wherein determining, by the processor, the plurality of blended-learning contents pertaining to the course boundary comprises using Natural Language Processing of previous textbooks or lecture notes.

10. The method of claim 1, wherein the plurality of sources includes at least one of Wikipedia™, repositories of educational institutions, or Massive Open Online Courses (MOOCs).

11. An apparatus, comprising:
    one or more processors configured to receive input data and a plurality of instructions from a group of users and automatically generate curricula, the one or more processors comprising:
    an assessor unit configured to integrate the input data from the group of users and store the input data, wherein the users comprise one or more instructors, a class of students attending a course, and one or more educational institutions;
    a searcher unit configured to search for a collection of course materials pertaining to the course from a plurality of sources, wherein the sources comprise a collection of substances from the one or more instructors, a plurality of institutional repositories, and a collection of educational databases publicly available;
    an analyzer unit configured to determine a plurality of blended-learning contents for a plurality of sub-groups of the class respectively by searching for a collection of course materials from a plurality of sources with a web-search engine or search Application Programming Interface (API), wherein the searching for the collection of course materials from the plurality of sources is performed using a set of keywords relevant to one or more core topics and a plurality non-core topics provided by the one or more instructors, wherein the plurality of blended-learning contents comprise a plurality of common topics for the class as a whole and a plurality of private topics for each of the sub-groups from output of the searcher, and wherein each of the sub-groups comprises at least one of the students in the class; and
    an optimizer unit configured to output a plurality of curricula based on the blended-learning contents for the plurality of sub-groups of the class, wherein the curricula are optimized with respect to a set of constraints, wherein the optimizer unit is further configured to perform operations comprising:
choosing a second set of the common topics from the first set of the common topics to fit within a common course length;
choosing a plurality of second sets of the private topics from the first sets of the private topics to fit within a private course length;
associating each of the second sets of the private topics to each of the students in the class;
organizing a common class schedule based on the second set of the common topics for the class as a whole;
organizing a plurality of private class schedules with the second sets of the private topics for each of the sub-groups of the class; and
generating a plurality of curricula each of which generated for a respective sub-group of the sub-groups of the class by combining the common class schedule, each of the private class schedules, a number of assignments, a number of projects, and a number of exams.

12. The apparatus of claim 11, wherein, in integrating the input data from the users, the assessor unit is configured to perform operations comprising:
classifying the input data according to the instructions;
ranking the input data according to the instructions;
calculating the input data according to the instructions; and
dividing the students into the plurality of sub-groups according to the instructions.

13. The apparatus of claim 11, wherein the assessor unit is also configured to perform operations comprising:
constructing the course boundary according to the input data of users, wherein the constructing of the course boundary according to the input data of users comprises:
assembling a concept graph of the course, wherein the concept graph comprises one or more of core topics and a plurality of non-core topics provided by the one or more instructors, wherein the non-core topics include one or more prerequisites and one or more possible topics of interest;
for each of the non-core topics, determining whether to exclude the respective non-core topic in the concept graph by analyzing the input data, wherein the input data comprises a collection of background profiles of the students and a set of requirements of the course; and
determining whether to add one or more relevant topics to the concept graph by analyzing the input data, wherein the input data further comprises a set of objectives of the course, and wherein the one or more relevant topics are associated with the objectives of the course.

14. The apparatus of claim 11, wherein the searcher unit is further configured to perform operations comprising:
amassing information pertaining to the course boundary by searching from the sources with a set of keywords relevant to the one or more core topics and the non-core topics in the course boundary.

15. The apparatus of claim 11, wherein the analyzer unit is further configured to perform operations comprising:
determining a first set of the common topics from the amassed information pertaining to the course boundary, wherein the first set of the common topics are correlated with the one or more core topics; and
determining a plurality of first sets of the private topics from the amassed information pertaining to the course boundary for each of the sub-groups of the class, wherein the first sets of the private topics are correlated with the non-core topics.

16. The apparatus of claim 11, wherein the constraints comprise two or more of the following:
a number of instructors;
a number of teaching assistants;
a common course length, wherein the common course length is defined as a product of a total number of scheduled common sessions and a number of planned hours per common session;
a private course length, wherein the private course length is defined as a product of a total number of scheduled private sessions and a number of planned hours per private session; and
a number of office hours from the instructors and the teaching assistants.

17. A non-transitory computer readable storage medium tangibly embodying a computer readable program code having computer readable instructions that, when executed, causes a processor to carry out a method of optimizing curricula, the method comprising:
integrating, by a processor, input data from a group of users, wherein the users provide a plurality of instructions for processing the input data, and wherein the users comprise one or more instructors, a class of students attending a course, and one or more educational institutions;
constructing, by the processor, a course boundary according to the input data of the users, wherein the course boundary comprises a plurality of topics of the course from the input data of the users;
determining, by the processor, a plurality of blended-learning contents pertaining to the course boundary for a plurality of sub-groups of the class respectively by searching for a collection of course materials from a plurality of sources with a web-search engine or search Application Programming Interface (API), wherein the searching for the collection of course materials from the plurality of sources is performed using a set of keywords relevant to one or more core topics and a plurality non-core topics provided by the one or more instructors, wherein the blended-learning contents comprise a plurality of common topics for the class as a whole and a plurality of private topics for each of the sub-groups, and wherein each of the sub-groups comprises at least one of the students in the class; and
optimizing, by the processor, a plurality of curricula based on the blended-learning contents for the plurality of sub-groups of the class with respect to a set of constraints,
wherein the constructing of the course boundary according to the input data of the users comprises:
assembling a concept graph of the course, wherein the concept graph comprises one or more core topics and a plurality of non-core topics provided by the one or more instructors; and
for each of the non-core topics, determining whether to exclude the respective non-core topic by analyzing the input data; and
wherein the determining of whether to exclude the respective non-core topic by analyzing the input data comprises:
receiving a plurality of responses from the students concerning each of the non-core topics;

assigning a plurality of thresholds for each of the responses concerning each of the non-core topics; and comparing each of the thresholds with a corresponding response for the respective non-core topic to exclude the respective non-core topic when the threshold is not exceeded.

18. The non-transitory computer readable storage medium of claim 17, wherein the integrating of the input data from the group of users comprises:

receiving the input data from the users;
receiving the instructions from the users;
classifying the input data according to the instructions;
ranking the input data according to the instructions;
calculating the input data according to the instructions; and
dividing the students into the plurality of sub-groups according to the instructions.

19. The non-transitory computer readable storage medium of claim 17, wherein the non-core topics include one or more prerequisites and one or more possible topics of interest, wherein the input data comprises a collection of background profiles of the students and a set of requirements of the course;

wherein the constructing of the course boundary according to the input data further comprises determining whether to add one or more relevant topics to the concept graph by analyzing the input data, wherein the input data further comprises a set of objectives of the course, and wherein the one or more relevant topics are associated with the objectives of the course.

* * * * *